3,642,713
POLYAMIDE COMPOSITION CONTAINING
SUCCINIC IMIDE COMPOUND
August Böckmann, Krefeld, Karl-August Essig, Karlheinz Feltgen, and Herbert Gröschel, Dormagen, and Hans Rudolph, Krefeld-Bockum, Germany, assignors to Farbenfabriken Bayer Aktiengesellschaft, Leverkusen, Germany
No Drawing. Filed Dec. 20, 1968, Ser. No. 785,753
Claims priority, application Germany, Jan. 2, 1968,
P 16 94 238.4
Int. Cl. C08g 20/20
U.S. Cl. 260—78 R    6 Claims

ABSTRACT OF THE DISCLOSURE

An antielectrostatic polyamide composition comprising a polyamide and a succinic acid imide compound of the formula

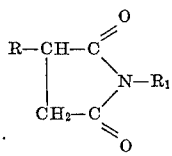

wherein R is an alkyl, alkenyl, alkylaryl, cycloalkyl or an aryl radical and $R_1$ is a polyoxyalkylen-moiety.

---

This invention relates to polyamide compositions containing a succinic acid imide compound as an antistatic agent.

In many instances, shaped articles made of synthetic, semisynthetic and natural material are known to undergo electrostatic charging during processing and subsequent application.

This undesirable phenomenon is caused by separation of charge of electrically neutral particles due to contact, friction and so on.

The level of electrical surface resistance and the degree of electrical surface conductivity are both decisive factors in the dissipation of electrostatic charges.

Any reduction in the electrical surface resistance, i.e. any improvement in the electrical surface conductivity, results very quickly in the elimination of these electrostatic charges and prevents them from accumulating on the surface of the particular moulding.

It is already known that by addition of polyethylene glycol ethers to synthetic polymers formation of electrostatic charge on shaped articles made therefrom can be suppressed to a certain extent (Belgian patent specification No. 631,199).

Unfortunately, this effect is not resistant to washing, in other words after a few washes the electrical surface resistance of antistatically finished polymers is as high as that of untreated products.

It is an object of this invention to provide a polyamide composition that shows a considerable antistatic effect.

It is another object of this invention to provide a polyamide composition that shows an antistatic effect that is resistant to washing.

It is a further object of this invention to provide polyamide shaped articles and filaments having a considerable antistatic effect which is resistant to washing.

These objects are accomplished by a polyamide composition comprising a polyamide and 0.2 to 30% by weight, based on the polyamide, of a succinic acid imide compound of the general formula

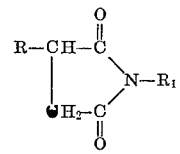

wherein R is a radical having 5 to 40 carbon atoms selected from the group consisting of an alkyl-, an alkenyl-, an alkylaryl-, a cycloalkyl- and an aryl radical, and $R_1$ is a radical selected from the group consisting of

and

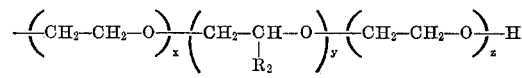

wherein $R_2$ represents a lower alkyl radical, $x$ represents an integer of from 1 to 300, $y$ represents an integer of from 1 to 100, and $z$ represents an integer of from 0 to 100.

The succinic acid imide compounds used in accordance with the invention are well known in the art and can be obtained, for example, by reacting compounds containing double bonds capable of addition, with maleic acid anhydride to form an alkenyl succinic acid anhydride which is converted by reaction with an alkylolamine, for example ethanolamine, into the corresponding imide and subsequently oxalkylated with alkylene oxides, for example ethylene oxide and propylene oxide, optionally after hydrogenation of the double bond.

Examples of succinic acid imide compounds of the general formula

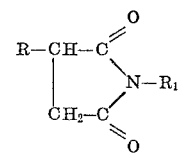

wherein R and $R_1$ have the meaning as given above, used in accordance with the invention, are the following:

| | | | | |
|---|---|---|---|---|
| 1 | R=octyl | | | $x=56$ |
| 2 | R=decyl | | | $x=56$ |
| 3 | R=octadecyl | | | $x=56$ |
| 4 | R=isododecyl | $R_1=$—[CH$_2$—CH$_2$—O]$_x$—H | | $x=56$ |
| 5 | R=benzyl | | | $x=191$ |
| 6 | R=cyclohexyl | | | $x=191$ |
| 7 | R=phenyl | | | $x=191$ |

Preferred compounds are those which have as the radical R an alkenyl radical having 9 to 24 carbon atoms, out of which the most preferred compounds are those corresponding to the following formulae:

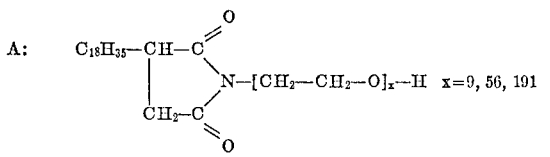

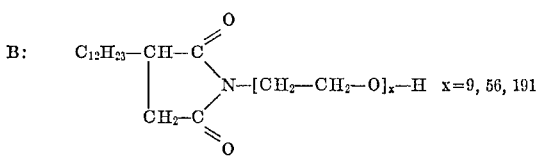

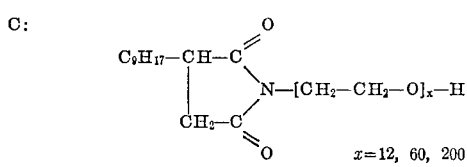

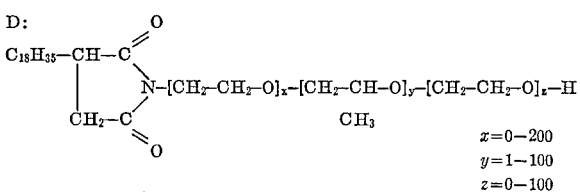

The compounds to be used in accordance with the invention may be added to the polyamides before, during or after polymerisation of the polyamide-forming compounds. It is also possible, however, to uniformly disperse the antielectrostatic compounds optionally as concentrates for example in the corresponding polyamides, either continuously or in batches during or after polymerisation by means of suitable mixers including stirrers, kneaders or screw extruders.

Polyamides such as described hereinabove constitute a well known class of high molecular weight linear polymers employed in a variety of application, such as molding powders, filaments, films etc. They are for example polycondensates of diamines and dicarboxylic acids, for example hexamethylene diamine, decamethylene diamine, ethylene diamine, trimethyl hexamethylene diamine, 1,4-bis-aminomethyl cyclohexane, m-xylylene diamine or 4,4-diaminodicyclohexyl methane, and adipic acid, decane dicarboxylic acid, oxalic acid, 1,4-cyclohexane dicarboxylic acid, terephthalic acid or isophthalic acid. They may also be polycondensates or polymers of aminocarboxylic acids or lactams such as caprolactam or lauric lactam, or polycondensates and polymers of several of the above-mentioned components.

In addition to the succinic acid imide compounds the polyamide compositions may also contain the usual additives such as pigments, dyes, light and heat stabilisers, optical brighteners, fillers such as glass and asbestos fibres, plasticisers, mould release agents, chain terminators, crystallisation stimulators and diffusion-promoting agents. Polyamide compositions containing these anti-electrostatically active succinic acid imide compounds can be processed to form shaped articles such as films, bristles, fibres, filaments, or products obtained from them such as woven fabrics and knitted fabrics.

The succinic acid imide compounds used in accordance with the invention are used in quantities of from 0.2 to 30% and preferably in quantities of from 0.5 to 20%.

The following examples are to further illustrate the invention without limiting it.

EXAMPLE 1

110 parts of compound A (degree of ethoxylation=9) as described on page 3 were added dropwise over a period of 1 hour to a polymerisation run of 396 parts of ω-caprolactam, 44 parts of ω-aminocaproic acid and 22 parts of benzoic acid at a temperature of 250° C. On completion of condensation, the reaction mixture was spun into a wire 2.0 mm. thick which was ultimately diced. The resulting chips were mixed with normal polyamide chips so that the concentration of compound A (degree of ethoxylation=9) amounted to 2%. After spinning the chips thus obtained from a screw melting-spinning machine, shaped articles were prepared from the resulting wire and the chips obtained from it. After exposing to ambient conditions of 23° C./50% relative humidity, the electrical surface resistance of these mouldings was measured to be $8.2 \cdot 10^{10}$ ohms, as measured with a steel edge electrode according to DIN 53,482 "Bestimmung des electrischen Widerstandes von Isolierstoffen." A comparison moulding made from the same polyamide without any additive had a surface resistance of $4.1 \cdot 10^{12}$ ohms.

EXAMPLE 2

Chips prepared as described in Example 1 were spun into filaments through a screw melt-spinning machine and the resulting filaments were stretched in the usual way. The ultimate fineness of each filament measured 15 den. The filaments were then cut to a staple length of 100 mm. These staple fibres were then washed at 60° C. in an automatic washing machine with five rinsing cycles using a fine detergent, and then tumble-dried for 30 minutes at 80° C. After conditioning at 23° C./50% relative humidity, the electrical surface resistance amounted to $5.6 \cdot 10^{10}$ ohms after one wash,
$4.8 \cdot 10^{11}$ ohms after 4 washes.

A comparison sample after one wash: $9.4 \cdot 10^{12}$ ohms, after 4 washes: $8.4 \cdot 10^{12}$ ohms.

EXAMPLE 3

Compound A (degree of ethoxylation=9) as described on page 3 was fed continuously by means of a metering pump to a 6-polyamide melt in a screw melt-spinning machine. The rotational speed of the screw was adjusted to give an optimal mixing effect. The amount added was 2% by weight. After it had been spun, the 2.0 mm. thick wire obtained was diced. Shaped articles produced from the resulting chips had an electrical surface resistance of $3.6 \cdot 10^{10}$ ohms, after conditioning at 23° C./50% relative humidity; a comparison moulding made from the same polyamide without addition of the antistatic compound had an electrical surface resistance of $4.1 \cdot 10^{12}$ ohms.

EXAMPLE 4

The chips obtained in accordance with Example 3 were spun as described in Example 3.

Electrical surface resistance after 1 wash $8.4 \cdot 10^{10}$ ohms, after 4 washes $3.6 \cdot 10^{11}$ ohms. A comparison sample containing no antistatic compound had a surface resistance of $9.4 \cdot 10^{12}$ ohms after 1 wash and one of $8.4 \cdot 10^{12}$ ohms after 4 washes.

If any one of the compounds denoted B, C or D in column 3 with the same degree of ethoxylation, is used instead of compound A in the above examples, excellent results are again obtained. In contrast, the use of polyethylene glycol ethers according to Belgian patent specification No. 631,199 gives poor results.

The test results are set out in the following table:

| Substance | Degree of ethoxylation | Addition (percent) | Process according to example No. | Shaped structure | Electrical surface resistance (staple fibres) After 1 wash | After several washes |
|---|---|---|---|---|---|---|
| Polyethylene glycol [1] | 40 | 2 | 1 | 3.6·10¹² | | |
| | | | 2 | | 3.8·10¹² | 4.0·10¹² |
| | | | 3 | 1.4·10¹² | | |
| | | | 4 | | 1.4·10¹² | 3.2·10¹² |
| Do [1] | | 4 | 1 | 8.4·10¹⁰ | | |
| | | | 2 | | 9.1·10¹¹ | 2.7·10¹² |
| | | | 3 | 2.6·10¹¹ | | |
| | | | 4 | | 2.4·10¹² | 1.8·10¹² |
| Comparative test no addition | | | 1 | 4.1·10¹² | | |
| | | | 4 | | 9.4·10¹² | 8.4·10¹² |
| A | 9 | 2 | 1 | 8.2·10¹⁰ | | |
| | | | 2 | | 5.6·10¹⁰ | 4.8·10¹¹ |
| | | | 3 | 3.6·10¹⁰ | | |
| | | | 4 | | 8.4·10¹⁰ | 3.6·10¹¹ |
| | | 4 | 1 | 2.7·10¹⁰ | | |
| | | | 2 | | 1.8·10¹⁰ | 8.0·10¹⁰ |
| | | | 3 | 3.3·10¹⁰ | | |
| | | | 4 | | 7.9·10¹⁰ | 2.6·10¹¹ |
| | 56 | 2 | 1 | 1.0·10¹¹ | | |
| | | | 2 | | 1.3·10¹¹ | 4.9·10¹¹ |
| | | | 3 | 4.0·10¹⁰ | | |
| | | | 4 | | 6.8·10¹⁰ | 1.4·10¹¹ |
| | | 4 | 1 | 5.0·10¹⁰ | | |
| | | | 2 | | 7.2·10¹⁰ | 2.0·10¹¹ |
| | | | 3 | 1.3·10¹⁰ | | |
| | | | 4 | | 5.7·10¹⁰ | 9.8·10¹⁰ |
| | 191 | 2 | 1 | 9.8·10¹⁰ | | |
| | | | 2 | | 6.6·10¹⁰ | 1.1·10¹¹ |
| | | | 3 | 3.8·10¹¹ | | |
| | | | 4 | | 5.9·10¹⁰ | 2.4·10¹¹ |
| | | 4 | 1 | 4.2·10¹⁰ | | |
| | | | 2 | | 1.2·10¹⁰ | 9.7·10¹⁰ |
| | | | 3 | 4.8·10¹⁰ | | |
| | | | 4 | | 4.5·10¹⁰ | 8.6·10¹⁰ |

[1] Used according to Belgian Patent specification 631,199.

What we claim is:
1. A composition consisting essentially of a filament forming linear polycarbonamide and 0.2 to 30% by weight, based on the weight of the polycarbonamide, of a succinic imide compound of the formula

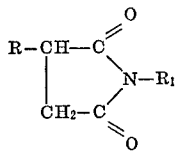

wherein R is a radical having 5 to 40 carbon atoms selected from the group consisting of an alkyl-, an alkenyl-, an alkyl-aryl-, a cycloalkyl- and an aryl radical, and $R_1$ is a radical selected from the group consisting of

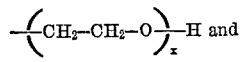 and

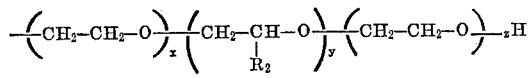

wherein $R_2$ represents a lower alkyl radical, $x$ represents an integer of from 1 to 300, $y$ represents an integer of from 1 to 100, and $z$ represents an integer of from 0 to 100.

2. The composition of claim 1, said succinic acid imide compound having the formula

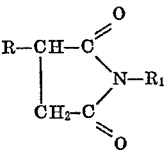

wherein R is an alkenyl radical having 9 to 24 carbon atoms, and $R_1$ is a radical selected from the group consisting of $\text{---}(CH_2\text{---}CH_2\text{---}O)_x\text{H}$ and

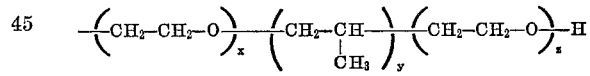

wherein $x$ is an integer of from 1 to 200, $y$ is an integer of from 1 to 100, $z$ is an integer of from 0 to 100.

3. The composition of claim 1, said succinic acid imide compound having the formula

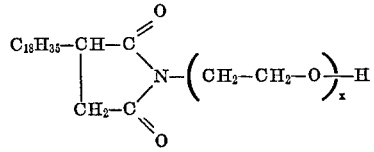

wherein $x$ is an integer of from 1 to 200.

4. A filament of the composition of claim 1.
5. The composition of claim 1 wherein said polyamide is polycaproamide.
6. A film of the composition of claim 1.

References Cited

UNITED STATES PATENTS 3,190,763    6/1965    Schleede et al.    260—78
3,361,701    1/1968    Polack et al.    260—78

HAROLD D. ANDERSON, Primary Examiner

U.S. Cl. X.R.

260—78 A, 78 L, 78 S